(12) United States Patent
Bhagavatha et al.

(10) Patent No.: US 11,720,604 B2
(45) Date of Patent: Aug. 8, 2023

(54) AUTOMATED REARRANGEMENT OF DIGITAL WHITEBOARD CONTENT

(71) Applicant: Zoom Video Communications, Inc., San Jose, CA (US)

(72) Inventors: Raghavendra Bhagavatha, San Jose, CA (US); Alicia Kepner, San Francisco, CA (US); Stephen Newton, San Jose, CA (US); Ihor Shadko, San Francisco, CA (US); Jeffrey William Smith, Milpitas, CA (US); Jordan Thiel, Leander, TX (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/515,536

(22) Filed: Oct. 31, 2021

(65) Prior Publication Data
US 2023/0140747 A1    May 4, 2023

(51) Int. Cl.
*G06F 16/28* (2019.01)
*G06N 20/00* (2019.01)

(52) U.S. Cl.
CPC .......... *G06F 16/287* (2019.01); *G06N 20/00* (2019.01)

(58) Field of Classification Search
CPC .............................. G06F 16/287; G06N 20/00
See application file for complete search history.

(56) References Cited

U.S. PATENT DOCUMENTS

| 10,860,985 | B2 | 12/2020 | Nelson et al. |
| 11,030,445 | B2 | 6/2021 | Yu et al. |
| 11,062,271 | B2 | 7/2021 | Nelson et al. |
| 2014/0282077 | A1 | 9/2014 | Wilson et al. |
| 2015/0135046 | A1* | 5/2015 | Moore ................. G06Q 10/101 715/202 |
| 2018/0232340 | A1 | 8/2018 | Lee |
| 2018/0314882 | A1* | 11/2018 | Yu ........................ G06K 9/6253 |

(Continued)

OTHER PUBLICATIONS

International Search Report and Written Opinion dated Feb. 6, 2023 in corresponding PCT Application No. PCT/US2022/047703.

(Continued)

*Primary Examiner* — Apu M Mofiz
*Assistant Examiner* — Husam Turki Samara
(74) *Attorney, Agent, or Firm* — Young Basile Hanlon & MacFarlane, P.C.

(57) ABSTRACT

Content items are rearranged within a digital collaboration space (e.g., a digital whiteboard) based on category metadata determined for the content items using one or more learning models. The content items are added to the digital collaboration space by one or more users. For each of the content items, category metadata is determined using a learning model that processes information associated with the content item. A rearrangement of the content items is determined based on the category metadata determined for each of the content items. The content items, rearranged according to the rearrangement, are then output to a layer of the digital collaboration space. Other rearrangements of the content items can be determined based on non-category metadata associated with the content items, and the content items, rearranged according to those other rearrangements, can be output to other layers of the digital collaboration space.

19 Claims, 9 Drawing Sheets

(56) References Cited

U.S. PATENT DOCUMENTS

| | | | |
|---|---|---|---|
| 2020/0064997 A1 | 2/2020 | Lewbel | |
| 2020/0066259 A1 | 2/2020 | Cronin et al. | |
| 2020/0260050 A1 | 8/2020 | Pell | |
| 2020/0319777 A1 | 10/2020 | Mondri et al. | |
| 2021/0117050 A1 | 4/2021 | Lewbel et al. | |
| 2021/0200942 A1 | 7/2021 | Jovanovic et al. | |
| 2021/0342785 A1* | 11/2021 | Mann | G06F 16/2308 |
| 2022/0327713 A1* | 10/2022 | Maximo | E21B 47/003 |

OTHER PUBLICATIONS

Wiggers Kyle: "Zoom rolls out AI-powered transcripts, note-taking features, and more", Internet Article, Oct. 15, 2019 (Oct. 15, 2019), pp. 1-3, XP093017775, Retrieved from the Internet: URL:https://venturebeat.com/business/zoom-rolls-out-ai-poweredÂ-transcripts-note-taking-featu res-and-more/ [retrieved on Jan. 25, 2023].

Elliot By: "What To Look For In An AI Note Taker", Internet Article, Sep. 13, 2021 (Sep. 13, 2021), pp. 1-14, XP093017796, Retrieved from the Internet: URL:https://hyperia.net/blog/what-to-look-for-in-an-aiÂ-note-taker [retrieved on Jan. 25, 2023].

* cited by examiner

AUTOMATED REARRANGEMENT OF DIGITAL WHITEBOARD CONTENT

FIELD

This disclosure relates to content arrangement, and, more specifically, to the automated rearrangement of content input, detected, or otherwise introduced within a digital space such as a digital whiteboard based on category metadata determined for the content.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
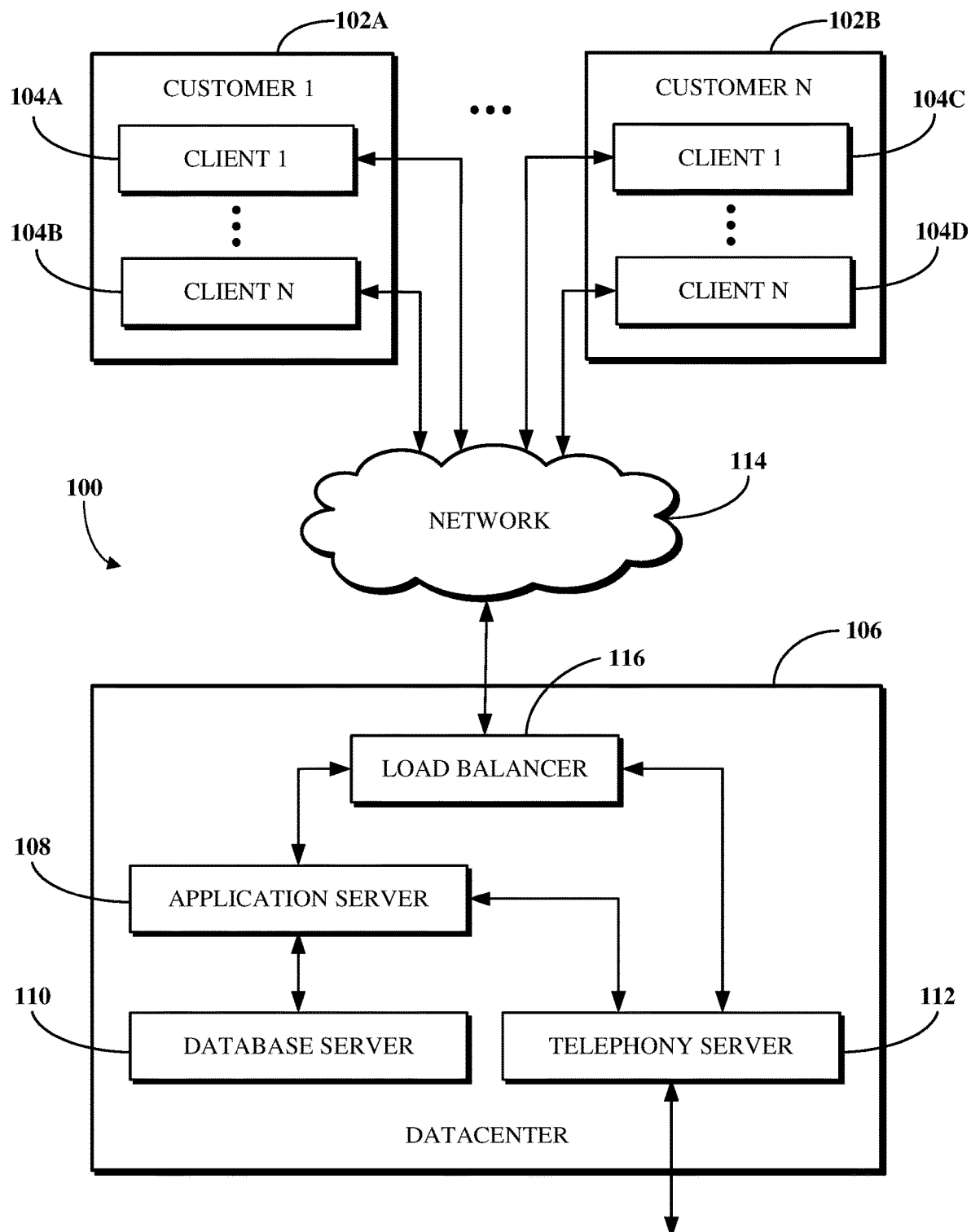
FIG. 1 is a block diagram of an example of an electronic computing and communications system.

Many projects start with a brainstorm meeting, which typically involves a group of people identifying and vetting ideas of various quality and collaborating to generate an expansive list of ideas with which to move forward. Brainstorm meetings may move at a rapid pace in a manner that makes it difficult to thoroughly document ideas without disrupting the important dialogue between the group. For example, a group of people may share prompts, thoughts, and the like with one another to stimulate idea generation. While the discussion may be unstructured to keep it organic, the lack of structure and back and forth between group members may result in ideas being documented with minimal information, with the goal of eventually returning to those ideas later on and hoping that whoever documented the minimal information recalls the ideas in fuller detail. For example, some or all of the people in a brainstorm group may each be given a notepad (e.g., a pad of sticky notes) and the direction to fill out the pages of that notepad with ideas as quickly as possible. The notepad pages may be left in piles or affixed to walls without being organized given the quick pace of the brainstorm exercise.

After the idea generation component of the brainstorm meeting is completed, it then becomes the job of one or more group members to manually review the notepad pages, deduce relevant category information for the notepad pages, and organize the notepad pages into those categories. However, this is a very time consuming process and is subject to considerable error where the person organizing the notepad pages does not properly understand the content written thereon. Furthermore, while the typical output of this idea review and organization process generally identifies one or more action items to be addressed, it may be very challenging to understand which of the ideas in a given category are the best, what they relate to, and so on. For example, ideas may be miscategorized or commonalities between ideas within a category or across categories may not be accurately identified. The group participating in the brainstorm must thus expend considerable effort to arrive at these action items, which may be demanded by a stakeholder seeking to ensure the brainstorm meeting was an effective use of time.

Recently, digital collaboration software, such as digital whiteboard software, has been adopted by brainstorming groups and others as an efficient medium for documenting ideas and sorting them. Conventional digital collaboration software allows users to add content, such as sticky notes, to a digital collaboration space to document ideas during a brainstorm meeting, and the ability to type ideas out may in some cases enable more detail to be captured in a short period of time. Digital collaboration spaces generally update changes in real-time to show the same content to all connected users at any given time. In this way, ideas may become visible to all users responsive to content documenting the ideas being added to a digital collaboration space. However, conventional digital collaboration software nonetheless suffers from certain drawbacks in that it does not provide a way to automatically categorize content entered therein. Thus, a user of conventional digital collaboration software participating in a brainstorm meeting must still manually sort through, categorize, and organize the content added within the digital collaboration space. One solution involves collecting manually-entered category information from users of the digital collaboration software and sorting digital collaboration content based on that manually-entered category information; however, this solution suffers from certain drawbacks, namely, in that the software relies entirely upon the accuracy and completeness of the manually-entered category information, which, given it is manually-entered, is susceptible to error.

Implementations of this disclosure address problems such as these by the automated rearrangement of content within software based on category metadata determined by software for the content. In particular, content items are rearranged within a digital collaboration space implemented by digital collaboration software (e.g., digital whiteboarding software) based on metadata criteria (e.g., category metadata) determined for the content items using one or more learning models. The content items are added to the digital whiteboard by one or more users. For each of the content items, the metadata criteria is determined using a learning model that processes information associated with the content item. A rearrangement of the content items is determined based on the metadata criteria determined for each of the content items. The content items, rearranged according to the rearrangement, are then output to a layer of the digital collaboration space. Other rearrangements of the content items can be determined based on other metadata criteria (e.g., non-category metadata) associated with the content items, and the content items, rearranged according to those other rearrangements, can be output to other layers of the digital collaboration space.

To describe some implementations in greater detail, reference is first made to examples of hardware and software structures used to implement a system for automated content rearrangement. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a unified communications as a service (UCaaS) platform or other software platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server (e.g., a virtual machine). In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
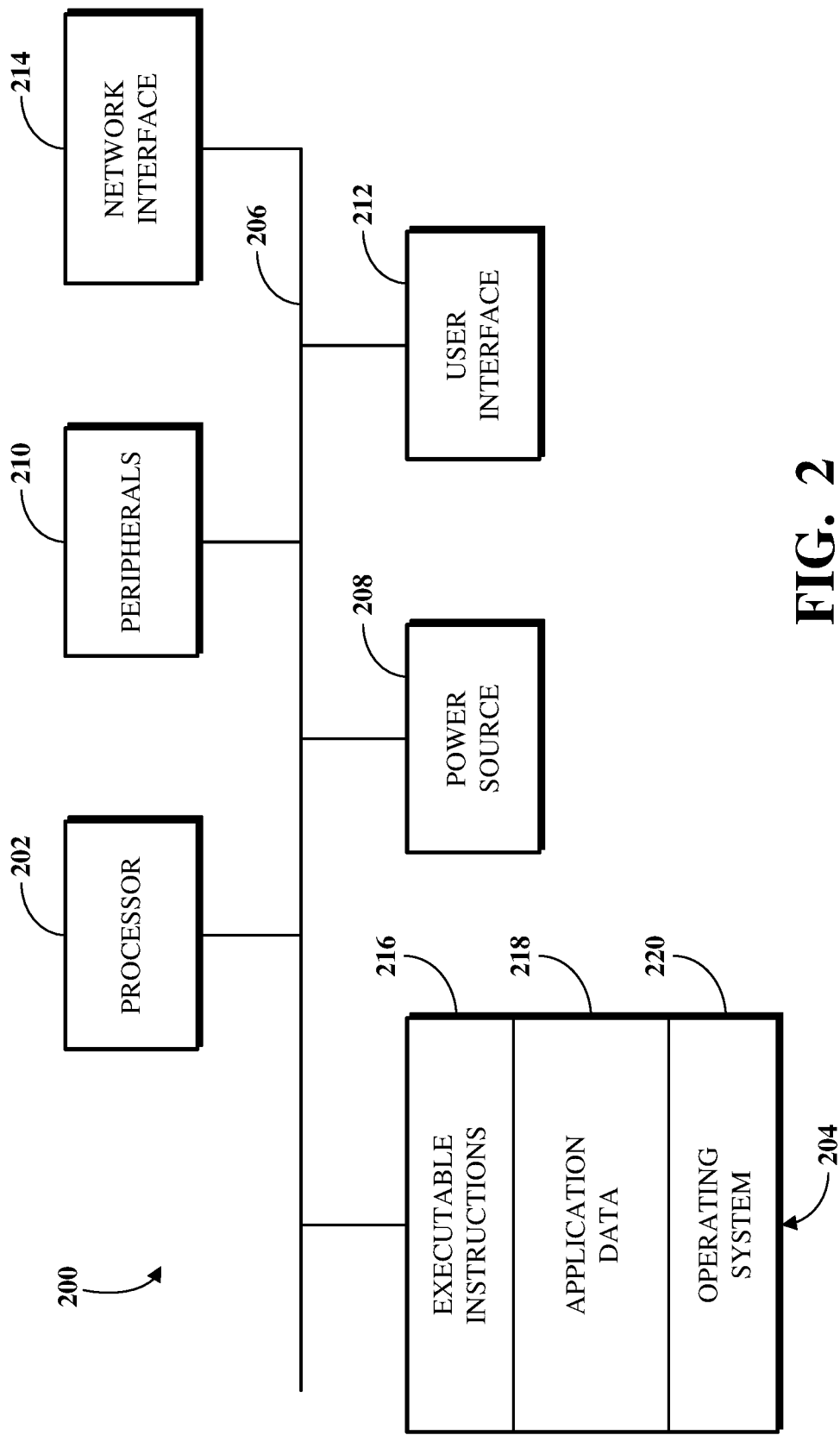
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
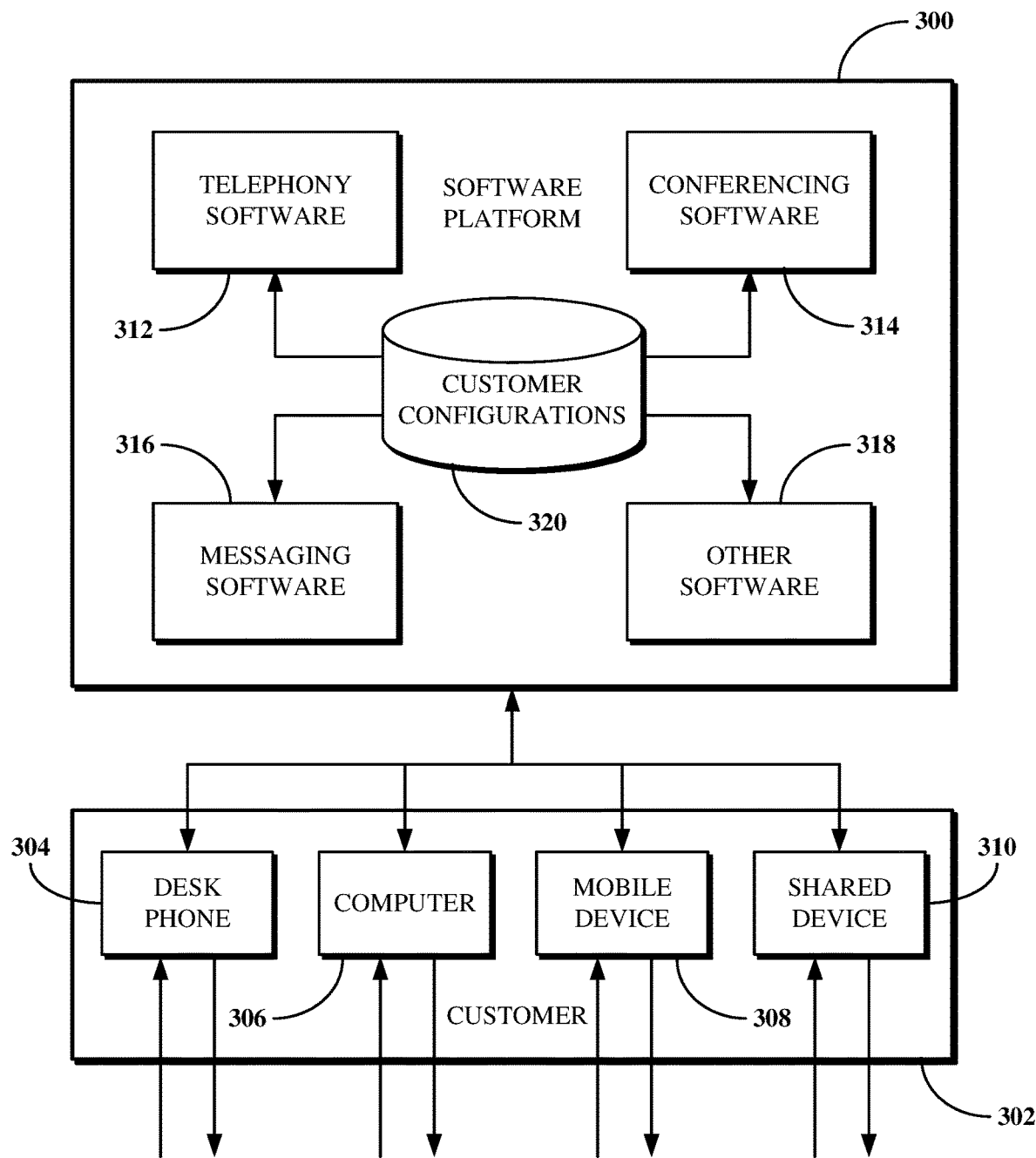
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include digital collaboration software, such as digital whiteboard software, for facilitating collaborations between users of the software platform 300 and/or automated content rearrangement software for automated rearrangement of content within a digital collaboration space implemented by digital collaboration software, such as a digital whiteboard.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
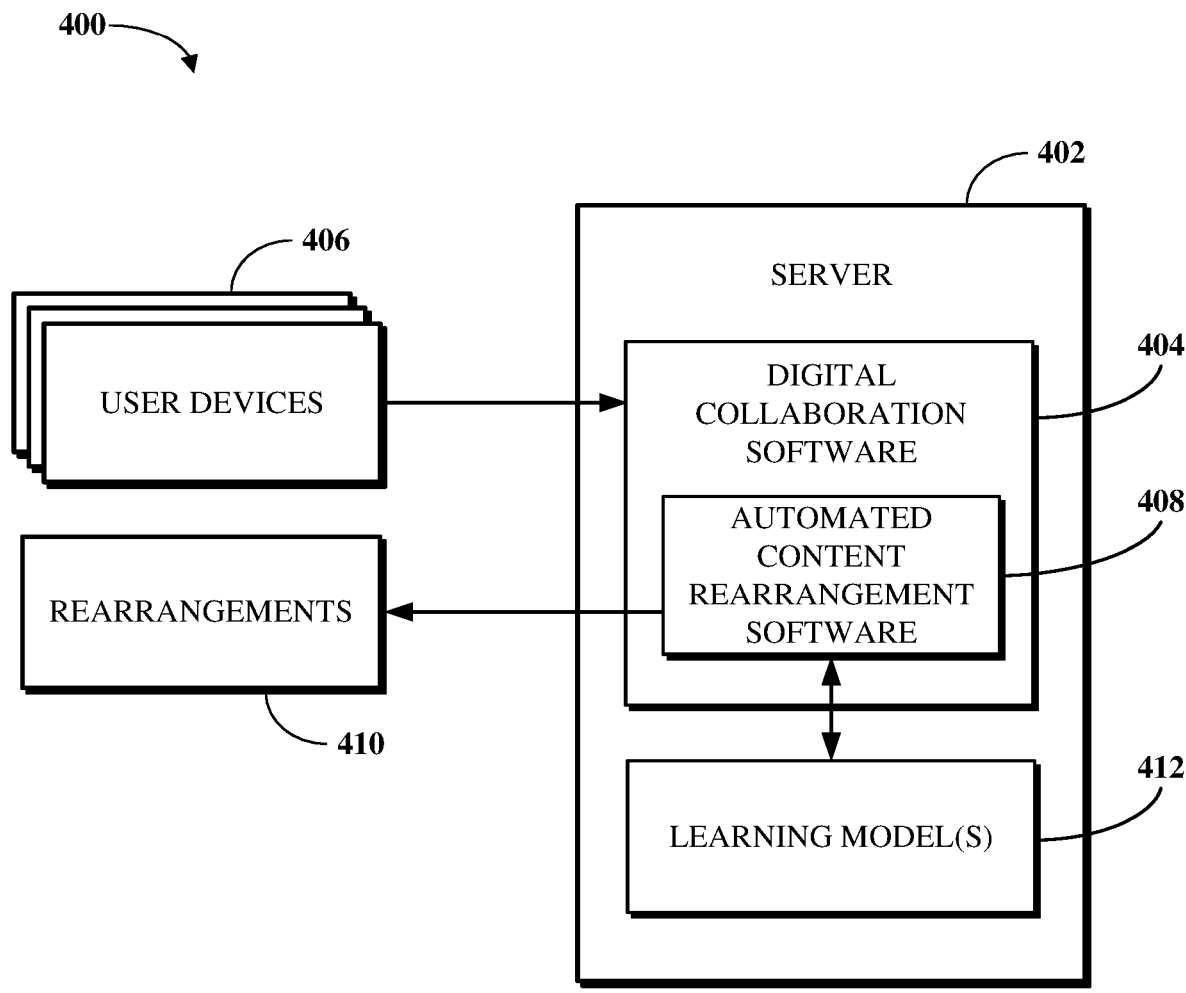
FIG. 4 is a block diagram of an example of a system for automated content rearrangement.

FIG. 4 is a block diagram of an example of a system 400 for automated content rearrangement. The system 400 includes a server 402 which runs digital collaboration software 404 for facilitating interactions within a digital collaboration space between users of user devices 406. The user devices 406 may be client devices, for example, the clients 304 through 310 shown in FIG. 3, or non-client devices.

A digital collaboration space instantiated or otherwise facilitated using the digital collaboration software 404 may be accessed and interacted with by the user devices 406. For example, one or more of the user devices 406 may be used to add content items to the digital collaboration space, modify content items within the digital collaboration space, and/or remove content items from the digital collaboration space. As used herein, a content item is, includes, or otherwise refers to content which may be visually represented in some way within a digital collaboration space. Examples of content items include, but are not limited to, text objects, such as text boxes and digital sticky notes, and non-text objects, such as illustrations and flowcharts.

The digital collaboration software 404 may be implemented as a software service of a software platform, for example, the software platform 300 shown in FIG. 3. Alternatively, the digital collaboration software 404 may be implemented as a web service accessible through web browsers running at the user devices 406. In some implementations, the digital collaboration software 404 and the digital collaboration space may respectively be digital whiteboard software and a digital whiteboard. In some implementations, the digital collaboration software 404 and the digital collaboration space may respectively be workplace productivity software and a workplace productivity space such as a document, spreadsheet, or slideshow presentation.

In some implementations, the digital collaboration space may be instantiated during a conference implemented using conferencing software, such as the conferencing software 314 shown in FIG. 3. For example, the digital collaboration space may be instantiated during a screen share operation within the conference. The digital collaboration space may then be accessed by devices connected to the conference, such as the user devices 406. In some such implementations, the digital collaboration software 404 or a portion thereof may be included in the conferencing software.

The user devices 406 operate and connect in a shared session with the digital collaboration space so that changes to the digital collaboration space made by one of the user devices 406 (e.g., an addition, modification, or removal of one or more content items) are visible, generally in real-time, to all of the user devices 406. In some cases, however, permissions for selectively limiting visibility into group edits to the digital collaboration space may be defined and customized. Sharing permissions for the digital collaboration space may be maintained on a paradigm basis. For example, where the digital collaboration space is accessed during a conference, the host of the conference may be recognized as the owner of the digital collaboration space with elevated permissions and control. In another example, outside of a conference setting, the digital collaboration space may be shared without a named host.

The digital collaboration software 404 includes automated content rearrangement software 408. The automated content rearrangement software 408 categorizes content items within a digital collaboration space initialized or otherwise facilitated by the digital collaboration software 404 according to category metadata determined for those content items and outputs rearrangements 410 of those content items according to the determined category metadata. A rearrangement 410 is or otherwise refers to a reordering or other relocation of some or all of the content items within the digital collaboration space.

The rearrangements 410 may refer to the original content items or copies of the content items. For example, the rearrangements 410 may be represented by the content items being rearranged within the same part (e.g., layer, as described below) of the digital collaboration space as they were added, such as by the content items themselves being rearranged within that same part. In such a case, the rearrangements 410 may represent or otherwise include data usable by the digital collaboration software 404 to relocate the subject content items on one or more existing layers of the digital collaboration space. In another example, the rearrangements 410 may be represented by the content items being rearranged within a different part (e.g., layer) of the digital collaboration space from the one in which they were added, such as by copies of the content items being rearranged within that different part. In such a case, the rearrangements 410 may represent or otherwise include new data for the digital collaboration software 404 to populate within one or more new layers of the digital collaboration space.

The rearrangements 410 may or may be used to represent the content items in one or more formats on one or more layers of the digital collaboration space. Examples of formats which may be used include tables (e.g., in which each column represents a different type of data or metadata by which to arrange the content items), graphs (e.g., in which different axes, bars, or the like represent different types of data or metadata by which to arrange the content items), flowcharts (e.g., in which different blocks or other objects within a flowchart represent different types of data or metadata by which to arrange the content items), and lists (e.g., in which each entry or section of entries represents a different type of data or metadata by which to arrange the content items). As used herein, a layer of a digital collaboration space generally includes or otherwise refers to a document, sheet, space, workbook, page, or other aspect configured to include the content items in one form or another. Layers of the digital collaboration space may be navigable by users of the user devices 406. For example, a user may freely move between a first layer on which various digital sticky notes are added to the digital collaboration space and a second layer within which those digital sticky notes are rearranged in some new format, such as a table or like format. Thus, by rearranging the content items according to their respective category metadata, the rearrangements 410 of the content items may improve visualization of the content items, which may initially be added to the digital collaboration space in arbitrary or suboptimal locations, according to the category metadata.

In some implementations, where the content items are rearranged into a new layer of the digital collaboration space, the automated content rearrangement software 408 may visually represent the content items for user ease in identifying the source locations for the rearranged content items (e.g., the original locations of those content items within the digital collaboration space). For example, the automated content rearrangement software 408 may add color coding information, alphanumeric coding information, or other trackable information to each of the content item in the source location and the content item in the rearrangement. A user of a user device 406 may match the subject information for a content item to verify its source location.

In some implementations, not all of the content items within a digital collaboration space may be rearranged according to the rearrangements 410. For example, the automated content rearrangement software 408 may in some cases determine that two or more of the content items are syntactically and/or semantically identical. To avoid duplication of content items in the rearrangements 410, the automated content rearrangement software 408 may thus determine the rearrangements 410 using only one of the two or more content items. In such a case, a visualization of the rearranged content items may include only one of the two or more content items.

As mentioned above, the content items may be rearranged based on category metadata determined for the content items. The category metadata generally indicates a category of content with which a subject content item corresponds. For example, where a content item includes the text "Options: blue, red, green," the category may be "Colors" and the category metadata may thus indicate that the content item corresponds to the "Colors" category. In another example, where a content item includes the text "Teams led by Joe Smith and Mary Sue," the category may be "Team Leaders" and the category metadata may thus indicate that the content item corresponds to the "Team Leaders" category. Categories may be generic, such as in the examples described above, or specific to a given digital collaboration space or meeting which uses the digital collaboration space.

The category metadata may in some cases be determined based on user input received from one or more of the user devices 406. In such a case, the category metadata may be deemed to be manually determined based on that user input. Alternatively, the automated content rearrangement software 408 may use one or more learning models 412 to determine the category metadata for the content items. The one or more learning models 412 may, for example, each be a machine learning model, such as one or more of a neural network (e.g., a convolutional neural network, recurrent neural network, or other neural network), decision tree, vector machine, Bayesian network, genetic algorithm, deep learning system separate from a neural network, or other machine learning model.

The one or more learning models 412 process metadata associated with the content items to determine the category metadata for the content items. The metadata associated with a content item includes information identifying one or more of a name or identifier of a user who added and/or modified the content item, text within the content item, positive and/or negative feedback on the content item (e.g., expressed as user votes or emojis), and other aspects usable to determine category metadata for the content item. The content item is tagged with the various metadata. For example, one or more users of the user devices 406 may input the metadata for the purpose of tagging the content item with it. Inputting the metadata may thus include the user of a subject user device 406 entering information into a field associated with the content item and that information being used as metadata with which the content item is tagged.

The one or more learning models 412 may be trained for processing different types of content items. For example, a first learning model 412 may be trained for text detection and recognition, such as to understand the text of a content item. In another example, a second learning model 412 may be trained for object detection and recognition, such as for non-text objects like illustrations entered into the digital collaboration space by freehand drawing, insertion from a source file or address, or the like. In some cases, such as where all of the content items are of a same type (e.g., text), a single learning model 412 may be used to determine category metadata for the content items. In other cases, such as where some of the content items are of one type (e.g., text) and others of the content items are of another type (e.g., illustration), multiple learning models 412 may be used to determine category metadata for the content items.

In particular, a learning model 412 trained for text detection and recognition may use natural language processing (NLP) to interpret the text metadata of a content item, such as based on the words of the text themselves and/or a semantic neighborhood of those words, and determine peripherally-related keyword phrases based on both the core language that is used and increasing areas of potential relativity. For example, the learning model 412 trained for text detection and recognition may be trained to ontologically recognize relationships between keywords, such as based on publicly available definitions and uses of those keywords and/or based on definitions and uses of those keywords specific to an entity (e.g., a customer of the software platform).

The learning model 412 determines text which is strongly or weakly correlated with one another using ontological relationships as a foundation and training data obtained from one or more digital collaboration spaces. The training data may refer to information identifying manual user rearrangements of content items based on the initial rearrangements determined using the automated content rearrangement software 408 being inaccurate. For example, a digital collaboration space may include a first content item with the text "Zoom Rooms Controller" and a second content item with the text "ZRC." The learning model 412 may initially not recognize that the second content item is an acronym of or otherwise related to the first content item, and in the absence of other metadata it may determine different category metadata for each of the first content item and the second content item. A user of a user device 406 may then present input manually rearranging the first content item and the second content item into the same category to the digital collaboration software 404. The digital collaboration software 404 can pass that input to the automated content rearrangement software 408 for use as training data for updating the learning model 412, or the digital collaboration software 404 can package that input as training data and provide it directly to the learning model 412 by bypassing the automated content rearrangement software 408. In particular, the learning model 412 may use that training data to determine a relationship between the first content item and the second content item. In a later digital collaboration space into which those first and second content items are added, the learning model 412 may thus use its updated understanding to determine same category metadata for the first content item and the second content item.

The automated content rearrangement software 408 may begin processing content items to determine the rearrangements 410 in response to input received from a user device 406. For example, at some point during a brainstorm meeting in which a digital collaboration space implemented using the digital collaboration software 404 is used to document content items representing brainstorm ideas, a user may cause the automated content rearrangement software 408 to determine the rearrangements 410 by interacting with a user interface element (e.g., a button on a graphical user interface) of the digital collaboration software 404. The automated content rearrangement software 408 may thus determine the rearrangements 410 responsive to or otherwise based on that user interface element interaction by the user. Alternatively, the automated content rearrangement software 408 may periodically (e.g., on a discrete time interval basis) or continuously process content items within a digital collaboration space to determine the rearrangements 410. For example, new rearrangements may be determined and/or previously determined rearrangements may be updated responsive to or otherwise based on changes within the digital collaboration space without specific input indicating to process the content items for rearrangement being received.

As described above, the automated content rearrangement software 408 generally determines the rearrangements 410 based on the category metadata determined for the content items. For example, the rearrangements 410 may be output at a layer of the digital collaboration space in a table or other format such as where each column of the table or aspect of the other format corresponds to a different category. In such a case, a single layer may be used to visually represent all of the content items which were rearranged in their rearranged locations according to their respective category metadata. However, in some cases, the automated content rearrangement software 408 may determine the rearrangements 410 based on metadata other than or in addition to the category metadata. For example, the rearrangements 410 may be output at a layer of the digital collaboration space in a table or other format such as where each column of the table or aspect of the other format corresponds to a different user who added the subject content items, a different portion of a timeline for completing one or more tasks related to the subject content items, or a score or other measurement of positive/negative feedback attributed to the subject content items by one or more users. In another example, the rearrangements 410 may be output at multiple layers of the digital collaboration space in which each layer includes a different table or other format representing rearranged content items according to the above examples. In such a case, a user may freely switch between those multiple layers to view the different rearrangements 410 of the content items as they like.

The metadata criteria which are used to determine the particular format and number of layers for the rearrangements 410 may be determined based on user input received from one or more of the user devices 406. For example, a user may specify the types of metadata over which the automated content rearrangement software 408 determines the rearrangements 410 and upon which those rearrangements 410 are visually represented to the users of the user devices 406. Alternatively, the metadata criteria may be automatically determined by the automated content rearrangement software 408. For example, the automated content rearrangement software 408 may determine a rearrangement 410 for each type of metadata. In another example, the automated content rearrangement software 408 may determine a rearrangement 410 for only those types of metadata with which a threshold number of content items correspond. In one such case, where only a couple of the content items have been given positive/negative feedback (e.g., in the form of upvotes/downvotes or likes/dislikes), the automated content rearrangement software 408 may not determine a rearrangement 410 according to positive/negative feedback metadata for the content items (i.e., not perform a rearrangement).

As mentioned above, the rearrangements 410 are generally visible to the users of the user devices 406 within the digital collaboration space implemented by the digital collaboration software 404. However, in some cases, the rearrangements 410 may be made available for viewing external to that digital collaboration space. For example, the digital collaboration software 404 may produce output representing the rearrangements 410 in a document format which can be shared with others beyond the users of the user devices 406. In one such case, a summary of the rearrangements 410 may be presented in a document file and emailed or otherwise made accessible to one or more stakeholders who wish to review the output of a brainstorm meeting conducted using the digital collaboration software 404. In another such case, where one or more of the rearrangements 410 are associated with a person, a summary of the content items represented by those rearrangements 410 may be presented to that person for actioning (e.g., as a form of task assignment). For example, that person may be determined using organizational charts which associate a task corresponding to the subject content items with one or more people within an organization.

In some implementations, information representing the content items within different digital collaboration spaces and/or rearrangements of those content items may be linked in some way. For example, the digital collaboration software 404, the automated content rearrangement software 408, or other software may track which users are most frequently contributing content items to digital collaboration spaces, which users tend to contribute content items to which categories of content, and/or categories of content which tend to have relatively high numbers of content items arranged therein across digital collaboration spaces. In another example, the content items and/or rearrangements across digital collaboration spaces may be mapped to one another based on some perceived commonality of metadata (e.g., category metadata). In one such case, where one digital collaboration space is associated with a first user group (e.g., a first team) and another digital collaboration space is associated with a second user group (e.g., a second team) and those digital collaboration spaces include a commonality of metadata, the digital collaboration software 404, the automated content rearrangement software 408, or other software may transmit a suggestion to one or more users of the first user group and/or the second user group to suggest a collaboration between those user groups and/or, where sharing is enabled, to share the content items and/or rearrangements of those respective digital collaboration spaces with the other user group.

In some implementations, one or more content items may be automatically added to the digital collaboration space, such as by the digital collaboration software 404, the automated content rearrangement software 408, or other software. For example, where the digital collaboration space is being used during a telephone call or a conference, a real-time transcription of the telephone call or conference can be generated, such as using an automatic speech recognition (ASR) or like tool included in or external to the software implementing the telephone call or conference (e.g., respectively, the telephony software 312 or the conferencing software 314 shown in FIG. 3). In this way, the real-time transcription can be processed to identify the content items which were discussed over the telephone call or conference, such as to increase efficiency of a brainstorm or like meeting by not requiring users to add those content items manually into the digital collaboration space. In some such implementations, content items added automatically may be added to a designated location within the digital collaboration space while awaiting rearrangement using the automated content rearrangement software 408. In other such implementations, content items added automatically may not be added within the digital collaboration space but later used by the automated content rearrangement software 408 and included in the rearrangements 410.

As shown and described, the digital collaboration software 404 includes the automated content rearrangement software 408. However, in some implementations, the automated content rearrangement software 408 may be external to the digital collaboration software 404. In some such implementations, the digital collaboration software 404 and the automated content rearrangement software 408 may be run on different servers.

The digital collaboration software 404 and the automated content rearrangement software 408 are usable as described above in various use cases. In one example use case, the digital collaboration software 404 and the automated content rearrangement software 408 may be used for brainstorming. For example, the users of the user devices 406 may be brainstorming ideas for something and documenting those ideas in one form or another as content items within a digital whiteboard. The ideas may be jotted down in random or otherwise arbitrary locations on a first layer of the digital whiteboard (e.g., wherever there is room). At some point during the brainstorm meeting, a user causes the automated content rearrangement software 408 to begin processing the content items. The automated content rearrangement software 408 determines the rearrangements 410 and outputs the content items on one or more layers of the digital whiteboard according to the rearrangements 410.

In another example use case, the digital collaboration software 404 and the automated content rearrangement software 408 may be used for competitions, such as innovation competitions in which competitors are tasked with conceiving of ideas for something. For example, teams of one or more users of the user devices 406 may use their own digital collaboration space to write down and discuss ideas as content items. As with the brainstorming example, the ideas may be jotted down in random or otherwise arbitrary locations on a first layer of the digital collaboration space. At the end of the innovation competition, or before moving to a next segment thereof, a user of a given team causes the automated content rearrangement software 408 to begin processing the content items. The automated content rearrangement software 408 determines the rearrangements 410 and outputs the content items on one or more layers of the digital collaboration space according to the rearrangements 410.

In yet another example use case, the digital collaboration software 404 and the automated content rearrangement software 408 may be used for contact center interactions between a software user and a contact center agent. For example, the contact center agent may record his or her notes regarding the contact center interaction with the software user as content items in a document or other file implemented by the digital collaboration software 404. The notes may be recorded in order with the discussion between the software user and the contact center agent. To efficiently analyze those content items, such as to rearrange them by category, the contact center agent at some point during the contact center interaction may cause the automated content rearrangement software 408 to begin processing the content items. The automated content rearrangement software 408 determines the rearrangements 410 and outputs the content items on one or more layers of the document or other file according to the rearrangements 410. In some such cases, the rearrangements 410 may persist such as for use by the same contact center agent or another contact center agent during subsequent contact center interactions with the same software user or with a different software user. For example, during a subsequent contact center interaction, the rearrangements 410 may be updated based on further notes, as content items, documented by a contact center agent.

Figure 5:
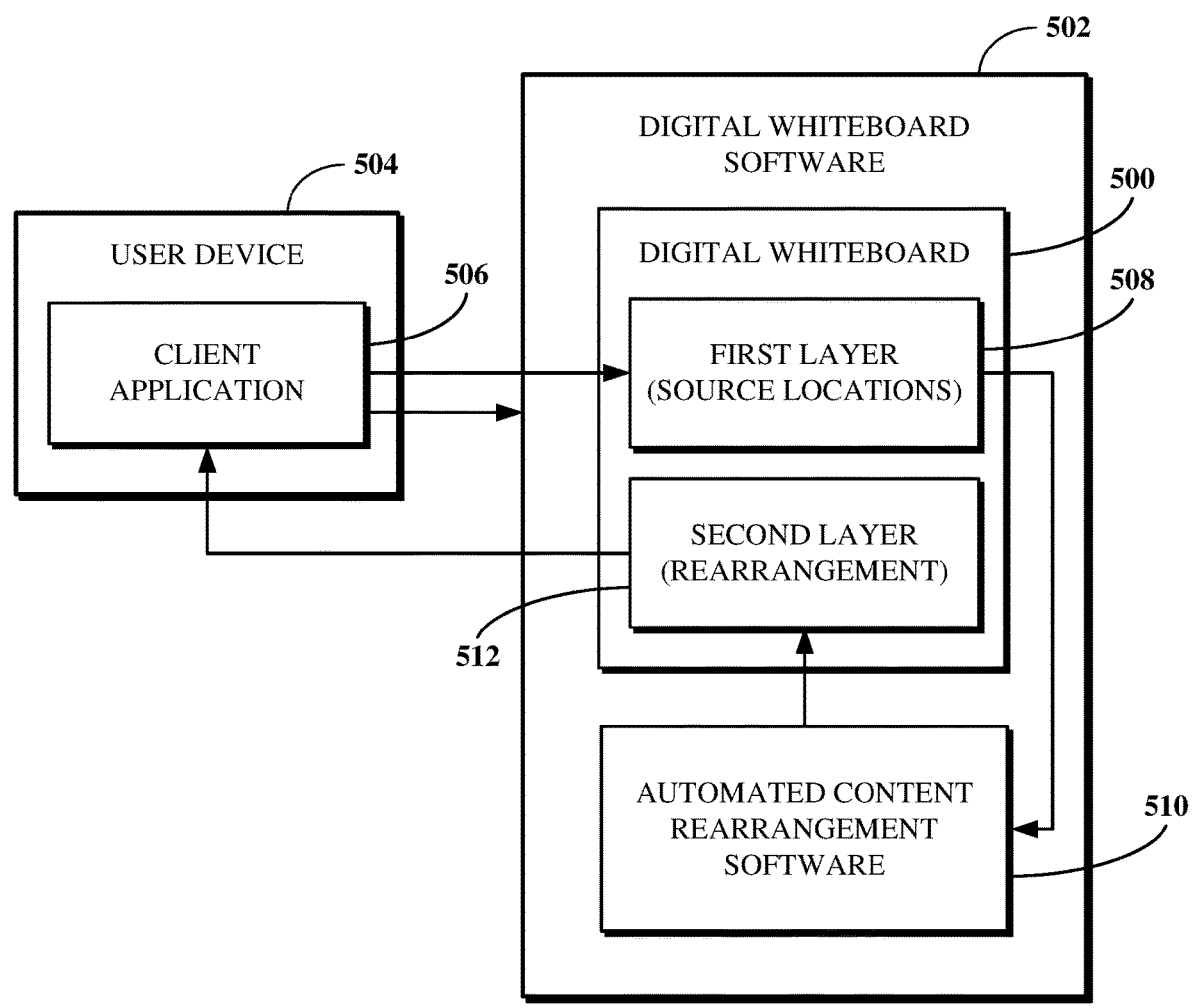
FIG. 5 is a block diagram of an example of automated rearrangement of content within a digital whiteboard.

FIG. 5 is a block diagram of an example of automated rearrangement of content within a digital whiteboard 500. The digital whiteboard 500 is implemented by digital whiteboard software 502. For example, the digital whiteboard software 502 may be the digital collaboration software 404 shown in FIG. 4. A user of a user device 504, which may, for example, be one of the user devices 406 shown in FIG. 4, accesses the digital whiteboard 500 using a client application 506 to add one or more content items into a first layer 508 of the digital whiteboard 500. The content items are considered to be in their source locations within the first layer 508. The user then interacts with a user interface element of the digital whiteboard software 502 to cause automated content rearrangement software 510, such as the automated content rearrangement software 408 shown in FIG. 4, to determine a rearrangement of the content items within the first layer 508. The automated content rearrangement software 510 outputs the content items according to the rearrangement to a second layer 512 of the digital whiteboard 500. The user may then view the rearranged content items within the second layer 512.

Figure 6:
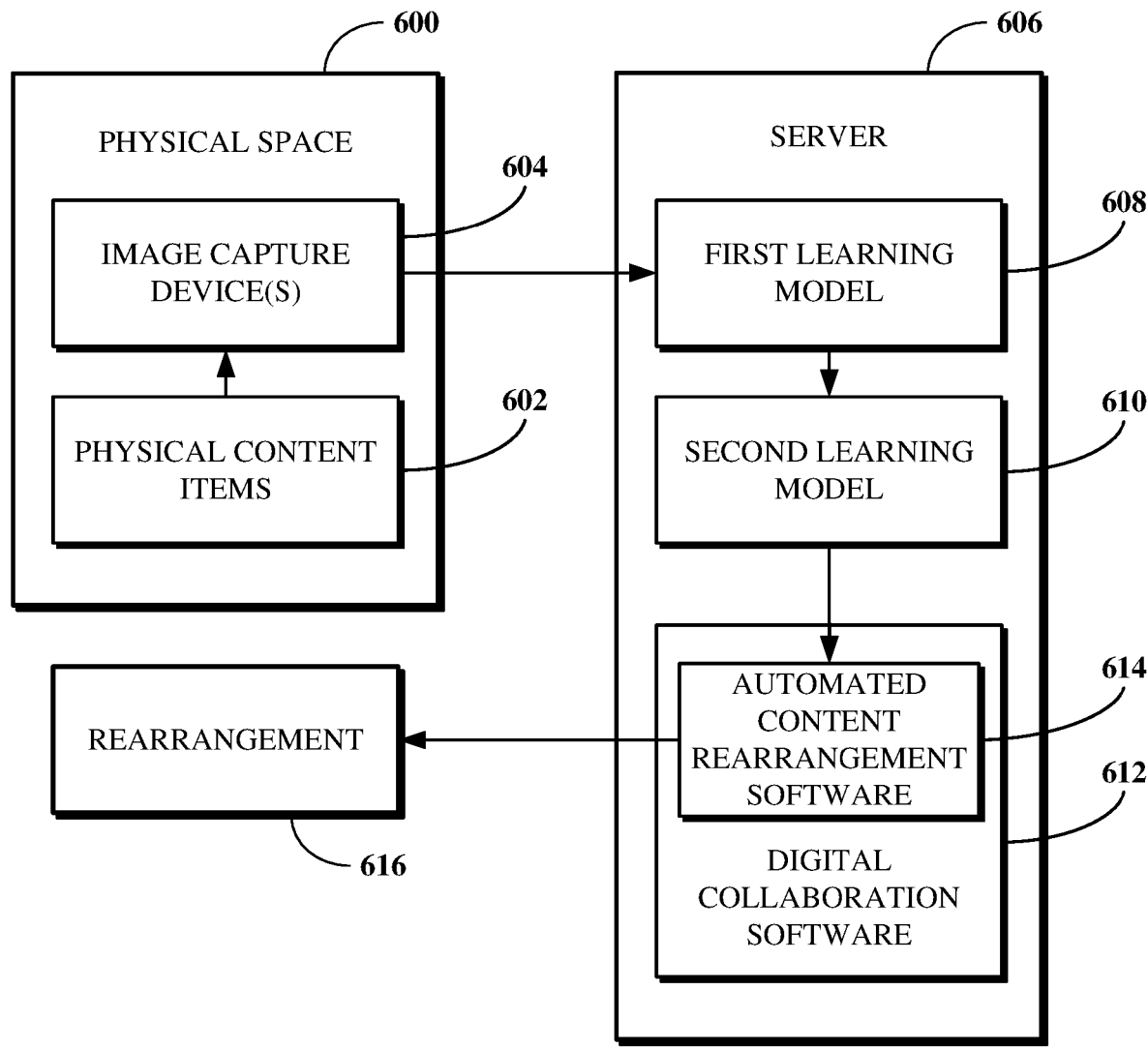
FIG. 6 is a block diagram of an example of arranging content detected from images.

FIG. 6 is a block diagram of an example of arranging content detected from images. Implementations of content arrangement described with respect to FIG. 6 refer to approaches in which content items are determined using images representing those content items within a physical space 600, such as a conference room, office, or other space. In particular, one or more physical content items 602 representing the content items are located within the physical space 600. For example, the physical content items 602 may be sticky notes in a pad formation, affixed to a table or surface, or otherwise located somewhere in the physical space 600. The physical content items 602 include content, such as text written thereon. The physical content items 602 are tangible matter which can be seen and held by a person within the physical space 600. As such, the physical content items 602 are capable of being photographed.

One or more image capture devices 604, such as cameras of mobile devices, cameras of appliances installed within the physical space 600, or the like, can be used to capture images of the physical content items 602. The images may then transmitted from the image capture devices 604 to a server 606, which may, for example, be the server 402 shown in FIG. 4. A first learning model 608 at the server 606 processes the images to detect and recognize the physical content items 602 as objects within the images. A second learning model 610 uses the object detection output from the first learning model 608 to detect and recognize the content of the physical content items 602, such as the text thereon. For example, the first learning model 608 may be a machine learning model trained for object detection and recognition, such as to detect and recognize common objects and/or objects commonly located within the physical space 600 based on shape, color, and/or other visual attributes. In another example, the second learning model 610 may be a machine learning model trained for text detection and recognition, such as to detect and recognize handwritten text on the objects detected and recognized by the first learning model 608. In some cases, the second learning model 610 may be trained based on the handwriting of one or more specific users.

The output of the second learning model 610, the text of the physical content items 602, is processed at digital collaboration software 612, such as to add content items representative of the text of the physical content items 602 into a digital collaboration space implemented by the digital collaboration software 612. For example, the digital collaboration software 612 may be the digital collaboration software 404 shown in FIG. 4. The digital collaboration software 612 includes automated content rearrangement software 614, which may, for example, be the automated content rearrangement software 408 shown in FIG. 4. The automated content rearrangement software 614 processes the content items as described above with respect to FIG. 4 to determine a rearrangement 616 of those content items. For example, the content items may be output to a layer of the digital collaboration space according to the rearrangement 616.

In some implementations, the digital collaboration software 612 may be omitted. For example, the automated content rearrangement software 614 may output the rearrangement 616 in a form and to a software aspect other than the digital collaboration software 612. In one such case, the automated content rearrangement software 614 can produce a document including the rearrangement 616 and store the document within a data store, transmit the document to one or more people (e.g., via email), or otherwise output the document.

Figure 7:
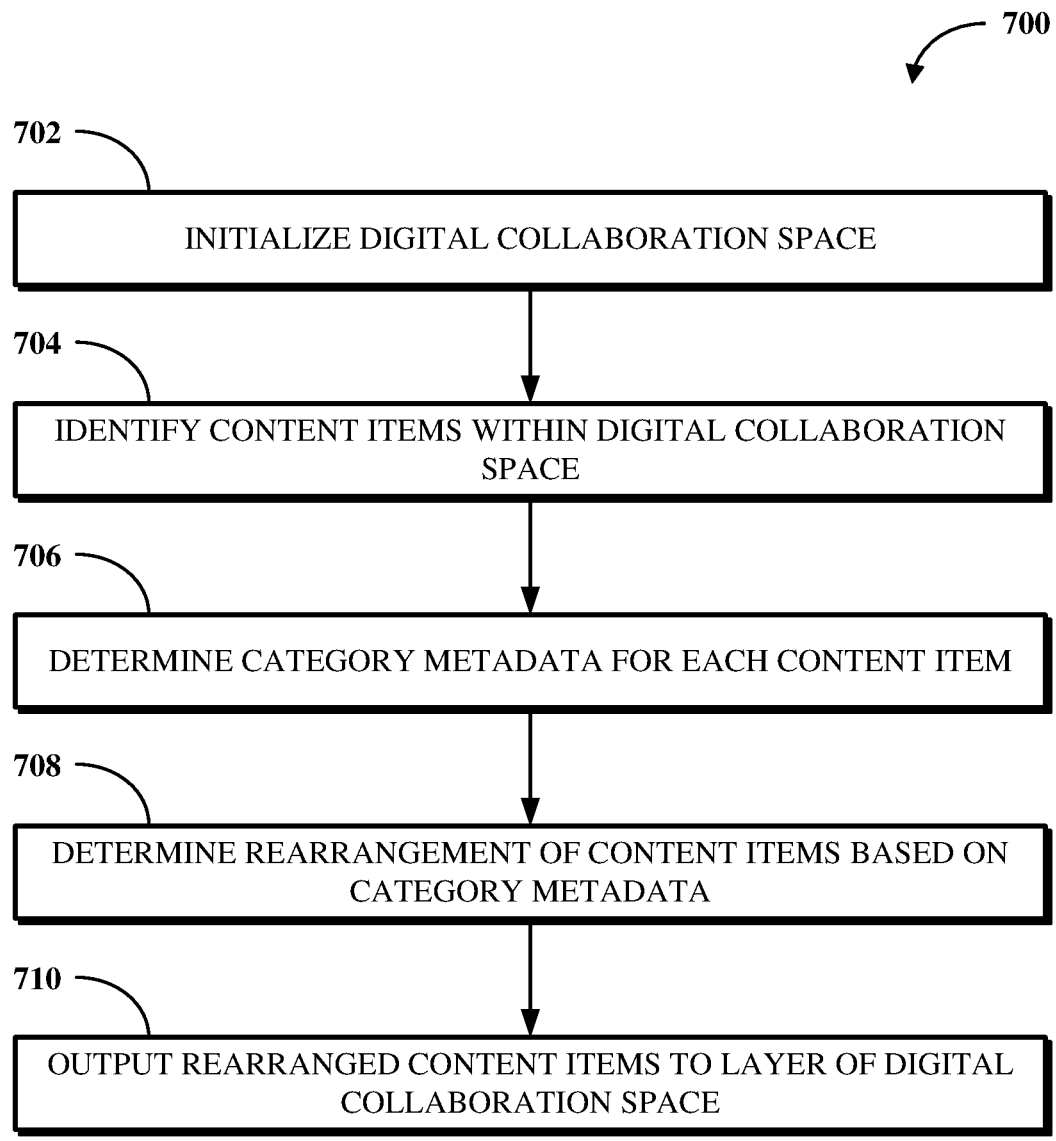
FIG. 7 is a flowchart of an example of a technique for automated content rearrangement.
Figure 8:
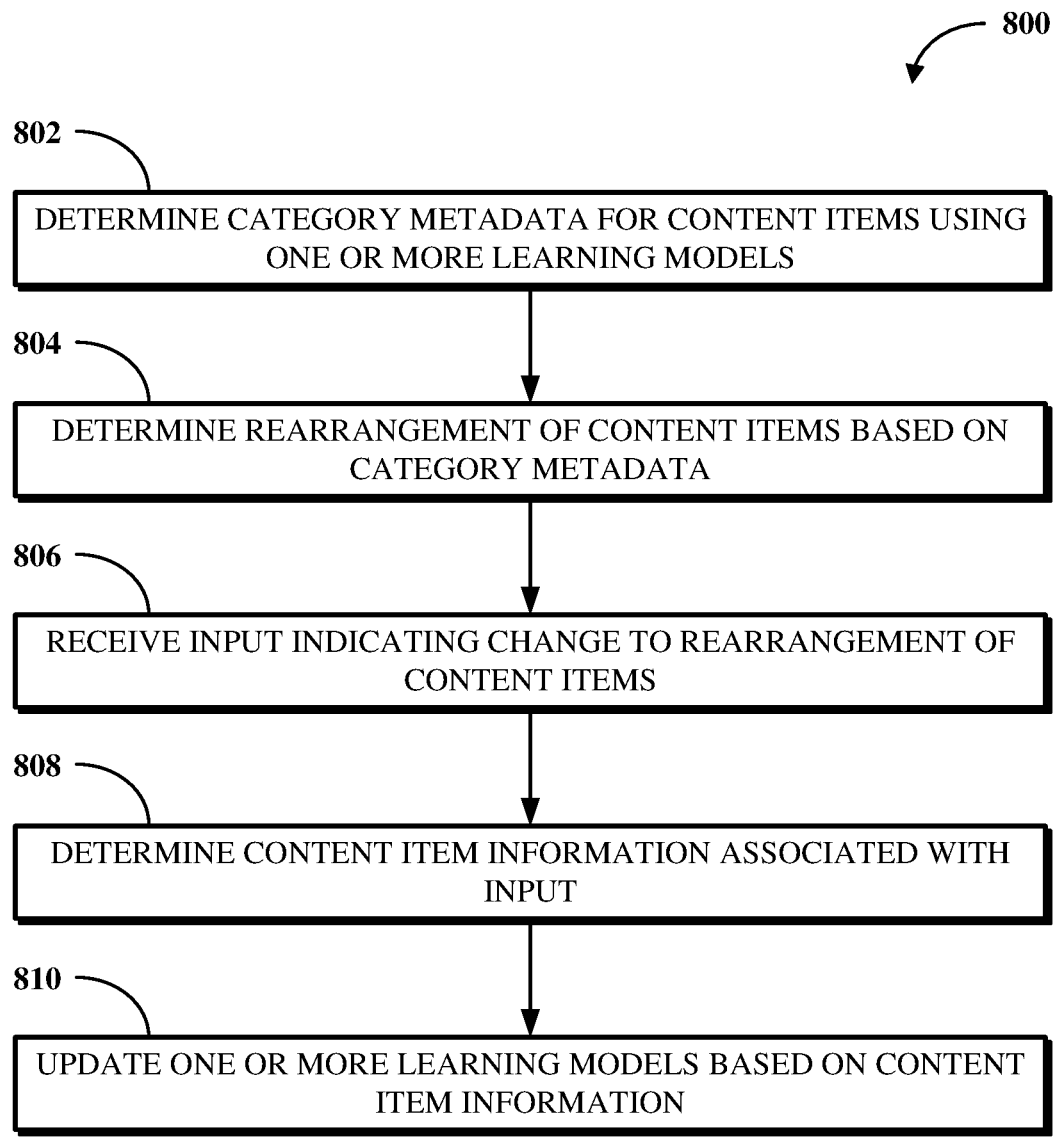
FIG. 8 is a flowchart of an example of a technique for training a learning model for automated content rearrangement.
Figure 9:
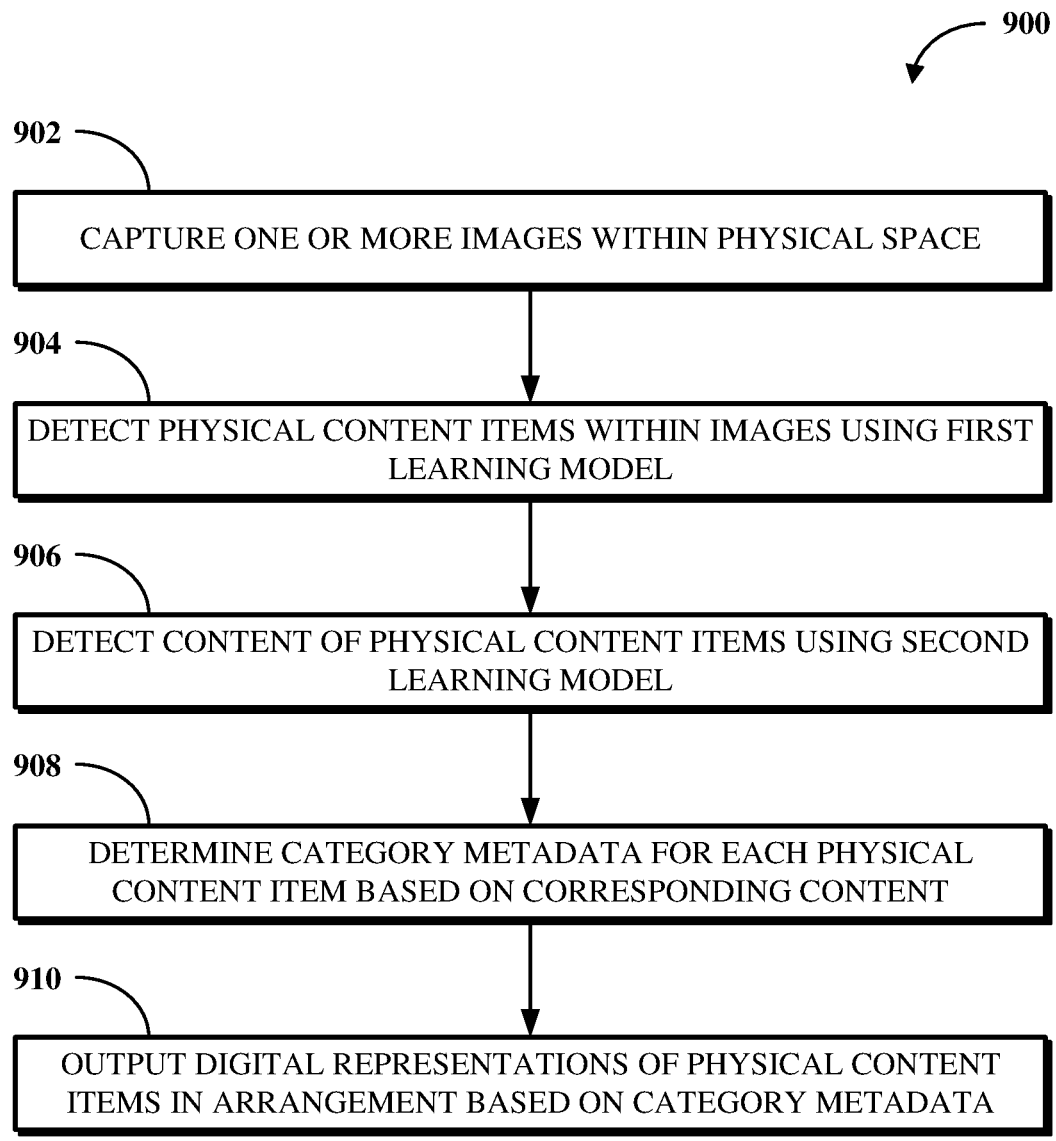
FIG. 9 is a flowchart of an example of a technique for arranging content detected from images.

To further describe some implementations in greater detail, reference is next made to examples of techniques which may be performed by or using a system for automated content rearrangement. FIG. 7 is a flowchart of an example of a technique 700 for automated content rearrangement. FIG. 8 is a flowchart of an example of a technique 800 for training a learning model for automated content rearrangement. FIG. 9 is a flowchart of an example of a technique 900 for arranging content detected from images.

The technique 700, the technique 800, and/or the technique 900 can be executed using computing devices, such as the systems, hardware, and software described with respect to FIGS. 1-6. The technique 700, the technique 800, and/or the technique 900 can be performed, for example, by executing a machine-readable program or other computer-executable instructions, such as routines, instructions, programs, or other code. The steps, or operations, of the technique 700, the technique 800, and/or the technique 900 or another technique, method, process, or algorithm described in connection with the implementations disclosed herein can be implemented directly in hardware, firmware, software executed by hardware, circuitry, or a combination thereof.

For simplicity of explanation, the technique 700, the technique 800, and the technique 900 each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for automated content rearrangement is shown. At 702, a digital collaboration space is initialized. The digital collaboration space is implemented using digital collaboration software. For example, the digital collaboration space may be a digital whiteboard implemented using digital whiteboard software. Initializing the digital collaboration space can include the digital collaboration software instantiating the digital collaboration space using server resources for access by one or more user devices.

At 704, content items are identified within the digital collaboration space. The content items may be added by one or more users of the user devices connected to the digital collaboration software. The content items include text objects and non-text objects. In some implementations, one or more of the content items may be added to the digital collaboration space based on a real-time transcription of a conference or a telephone call. For example, the digital collaboration space may be used during a conference or telephone call, and at least one of the content items may be automatically added to the digital whiteboard based on the real-time transcription of the conference or telephone call.

At 706, category metadata is determined for each content item. The category metadata is determined using one or more learning models that process information associated with the respective content items. The information associated with a content item includes metadata, such as metadata identifying a user who added the content item to the digital collaboration space, metadata identifying text or other content of the content item, and/or metadata identifying positive/negative feedback to the content item. The one or more learning models used to process the information associated with a content item is based on the type of content item. For example, where the content item is a text object, a first learning model trained for text recognition can be used to determine the category metadata for the content item. In another example, where the content item is a non-text object, a second learning model trained for object recognition can be used to determine category metadata for the content item.

At 708, a rearrangement of the content items is determined based on the category metadata determined for the content items. In some cases, the rearrangement of the content items is determined responsive to input received from a user device. In other cases, the rearrangement is determined by automatically processing the content items on a periodic basis. The rearrangement represents a reordering or other relocation of the content items from their source locations within the digital collaboration space relative to one another based on the category metadata. In particular, determining the rearrangement of the content items includes grouping ones of the content items based on categories represented by the category metadata determined for each of the content items. In some cases, a determination can be made that two or more of the content items correspond to common content, such as by those two or more common items being syntactically and/or semantically identical. Determining the rearrangement of the content items in such a case can include using only one of the two or more of the content items within the rearrangement of the content items.

In some implementations, determining the rearrangement of the content items can include determining a sequence of operations associated with two or more of the content items having common category metadata and rearranging the two or more of the content items to represent a flowchart indicative of the sequence of operations. For example, a sequence of operations may be inferred using a learning model (e.g., a machine learning model trained for text recognition) based on context of the two or more of the content items. Those content items may thus be arranged, according to a determined rearrangement, based on that inferred sequence of operations, such as in a flowchart format.

At 710, the content items rearranged according to the rearrangement are output to a layer of the digital collaboration space. Outputting the content items to the layer of the digital collaboration space includes rearranging the content items according to the determined rearrangement. The layer of the digital collaboration space to which the rearranged content items are output may be a layer of the digital collaboration space within which the content items are identified. Alternatively, the layer of the digital whiteboard to which the rearranged content items are output may be different from a layer of the digital whiteboard within which the content items are identified. The layer of the digital collaboration space to which the rearranged content items are output may then be accessed by one or more user devices. In some implementations, a document indicating the content items rearranged according to the rearrangement, such as is output within the layer of the digital collaboration space, may be produced. The document may, for example, be shared outside of the digital collaboration space.

In some implementations, the technique 700 may be performed to determine a rearrangement of the content items other than based on category metadata or to determine one or more rearrangements of the content items other than based on category metadata in addition to the rearrangement determined based on the category metadata. For example, the rearrangement may instead be determined based on user metadata or other non-category metadata. In another example, a second rearrangement based on non-category metadata may be determined and the content items rearranged according to the second rearrangement may be output to a second layer of the digital collaboration space. In such a case, both layers of the digital collaboration space are accessible to the one or more user devices.

In some implementations, rearrangement information obtained from a user device after the determination of the rearrangement of the content items can be used to update the one or more learning models. For example, the determined rearrangement may be inaccurate such as based on insufficient training data used to train a learning model used to determine the category information. In such a case, input from a user device specifying that the rearrangement was inaccurate, such as by the input indicating to move a given content item from one category to another, can be used to update, or further train, the learning model. In particular, that input can be used to tune the learning model to recognize that the content item and others like it should correspond to the category to which it was moved and not the earlier-determined category.

Referring next to FIG. 8, the technique 800 for training a learning model for automated content rearrangement is shown. At 802, category metadata is determined for content items using one or more learning models. For example, the category metadata can be determined as described above with respect to FIG. 7.

At 804, a rearrangement of the content items is determined based on the category metadata. For example, the rearrangement of the content items can be determined as described above with respect to FIG. 7.

At 806, input indicating a change to the rearrangement of the content items is received. The input in particular indicates that one or more of the content items has been manually moved, by a user of a user device, from one part of the rearrangement of the content items to another so as to indicate that the one or more of the content items correspond to categories other than the categories earlier-determined therefor. For example, a content item with the text "Green energy" may initially be determined to have category metadata corresponding to the category "Colors." A user may notice the content item as having been arranged in a table column corresponding to the "Colors" category. For example, the user may believe that the content item actually corresponds to the "Climate change" category. The user may thus move the content item from the column corresponding to the "Colors" category to a column corresponding to the "Climate change" category. The input indicates this change.

At 808, content item information associated with the input is determined. Based on the input indicating the change to the arrangement of the content items, information, such as various metadata associated with the subject content items, is determined. The information is used to determine new understandings for the content items, such as by causing one or more learning models to re-map their understandings of the content items from an original one (e.g., associated with an earlier-determined category) to a new one (e.g., associated with the new category determined based on the input).

At 810, the one or more learning models are updated based on the content item information. For example, updating the one or more learning models can include using the content item information to update, or train, the one or more learning models to recognize that further instances of the subject content items should be categorized according to the new category corresponding to the received input.

Referring last to FIG. 9, the technique 900 for arranging content detected from images is shown. At 902, one or more images are captured within a physical space. The images may be captured using a camera of a mobile device, a camera of an appliance installed within the physical space, or another camera. The images may be captured at one time during a conference within the physical space, at periodic times throughout that conference, or continuously throughout that conference.

At 904, one or more physical content items (e.g., sticky notes) are detected within the one or more images using a first learning model. The first learning model may, for example, be a machine learning model trained for object detection and recognition. The first learning model processes the images to detect and recognize objects representing the one or more physical content items within the images.

At 906, content of the physical content items is detected using a second learning model. The second learning model may, for example, be a machine learning model trained for text detection and recognition. The second learning model processes the output of the first learning model to detect and recognize content of the physical content items, such as text (e.g., handwritten text) or illustrations included in the physical content items.

At 908, category metadata for each of the physical content items is determined based on the content corresponding to the content items. For example, the category metadata can be determined as described above with respect to FIG. 7.

At 910, digital representations of the physical content items are output in an arrangement that is based on the category metadata. The digital representations are content items added within a digital collaboration space to represent the content of the physical content items. The arrangement of those digital representations may be determined as described above with respect to the rearrangements determined as described with respect to FIG. 7.

The implementations of this disclosure describe methods, systems, devices, apparatuses, and non-transitory computer readable media for automated rearrangement of content within a digital collaboration space. In some implementations, a method comprises, a non-transitory computer readable medium stores instructions operable to cause one or more processors to perform operations comprising, and/or an apparatus comprises a memory and a processor configured to execute instructions stored in the memory for identifying content items within a digital collaboration space (e.g., a digital whiteboard); for each of the content items, determining category metadata using one or more learning models that process information associated with the content item; determining a rearrangement of the content items based on the category metadata determined for each of the content items; and outputting the content items rearranged according to the rearrangement to a layer of the digital collaboration space (e.g., the digital whiteboard).

In some implementations of the method, the non-transitory computer readable medium, and/or the apparatus, the rearrangement of the content items is determined responsive to input received from a user device.

In some implementations of the method, the non-transitory computer readable medium, and/or the apparatus, the layer of the digital collaboration space (e.g., the digital whiteboard) is a first layer of the digital collaboration space (e.g., the digital whiteboard), and the method comprises, the operations comprise, and/or the instructions include instructions for determining a second rearrangement of the content items according to metadata other than the category metadata; and outputting the content items rearranged according to the second rearrangement to a second layer of the digital collaboration space (e.g., the digital whiteboard), wherein the first layer of the digital collaboration space (e.g., the digital whiteboard) and the second layer of the digital collaboration space (e.g., the digital whiteboard) are both accessible to one or more user devices.

In some implementations of the method, the non-transitory computer readable medium, and/or the apparatus, the method comprises, the operations comprise, and/or the instructions include instructions for determining that two or more of the content items correspond to common content, and determining the rearrangement of the content items comprises using only one of the two or more of the content items within the rearrangement of the content items.

In some implementations of the method, the non-transitory computer readable medium, and/or the apparatus, the content items include a first content item comprising a text object and a second content item comprising a non-text object, and determining the category metadata comprises: using a first learning model trained for text recognition to determine category metadata for the first content item; and using a second learning model trained for object recognition to determine category metadata for the second content item.

In some implementations of the method, the non-transitory computer readable medium, and/or the apparatus, the method comprises, the operations comprise, and/or the instructions include instructions for using rearrangement information obtained from a user device after the determination of the rearrangement of the content items to update the one or more learning models.

In some implementations of the method, the non-transitory computer readable medium, and/or the apparatus, determining the rearrangement of the content items comprises: determining a sequence of operations associated with two or more of the content items having common category metadata; and rearranging the two or more of the content items to represent a flowchart indicative of the sequence of operations.

In some implementations of the method, the non-transitory computer readable medium, and/or the apparatus, one or more of the content items is added to the digital collaboration space (e.g., the digital whiteboard) by processing an image representing a physical content item within a physical space.

In some implementations of the method, the non-transitory computer readable medium, and/or the apparatus, the layer of the digital collaboration space (e.g., the digital whiteboard) to which the rearranged content items are output is different from a layer of the digital collaboration space (e.g., the digital whiteboard) within which the content items are identified.

In some implementations of the method, the non-transitory computer readable medium, and/or the apparatus, the information processed to determine the category metadata for each content item includes non-category metadata associated with the content item.

In some implementations of the method, the non-transitory computer readable medium, and/or the apparatus, the digital collaboration space (e.g., the digital whiteboard) is used during a conference or telephone call and at least one of the content items is automatically added to the digital collaboration space (e.g., the digital whiteboard) based on a real-time transcription of the conference or telephone call.

In some implementations of the method, the non-transitory computer readable medium, and/or the apparatus, the method comprises, the operations comprise, and/or the instructions include instructions for determining a second rearrangement of the content items based on non-category metadata associated with the content items; and outputting the content items rearranged according to the second rearrangement to a second layer of the digital collaboration space (e.g., the digital whiteboard).

In some implementations of the method, the non-transitory computer readable medium, and/or the apparatus, determining the rearrangement of the content items comprises automatically processing the content items on a periodic basis.

In some implementations of the method, the non-transitory computer readable medium, and/or the apparatus, the content items are color coded to identify source locations of the content items within the digital collaboration space (e.g., the digital whiteboard).

In some implementations of the method, the non-transitory computer readable medium, and/or the apparatus, the method comprises, the operations comprise, and/or the instructions include instructions for producing a document indicating the content items rearranged according to the rearrangement.

In some implementations of the method, the non-transitory computer readable medium, and/or the apparatus, the content items include text objects and non-text objects.

In some implementations of the method, the non-transitory computer readable medium, and/or the apparatus, the layer of the digital collaboration space (e.g., the digital whiteboard) to which the rearranged content items are output is a layer of the digital collaboration space (e.g., the digital whiteboard) within which the content items are identified.

In some implementations of the method, the non-transitory computer readable medium, and/or the apparatus, the layer is a first layer, and the method comprises, the operations comprise, and/or the instructions include instructions for outputting the content items rearranged according to a second rearrangement determined based on non-category metadata associated with the content items to a second layer of the digital collaboration space (e.g., the digital whiteboard).

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    training, at one or more server devices using a training data set corresponding to past digital whiteboard content item rearrangements, a machine learning model for text detection and recognition using natural language processing to enable the trained machine learning model to determine metadata associated with digital whiteboard content items;
    instantiating, at the one or more server devices during a video conference implemented using conferencing software of a unified communications as a service software platform and to which one or more user devices are connected, a digital whiteboard using digital whiteboard software of the unified communications as a service software platform;
    generating, at the one or more server devices according to input obtained from the one or more user devices during the video conference, content items within the digital whiteboard at initial locations relative to one another;
    for each of the content items, processing, at the one or more server devices during the video conference, the content item using the trained machine learning model to determine first metadata corresponding to text or non-text content visually represented within the content item and second metadata corresponding to data not visually represented within the content item;
    determining, at the one or more server devices during the video conference, a first rearrangement of the content items based on the first metadata determined for each of the content items, wherein locations of the content items relative to one another in the first rearrangement are different from the initial locations;
    determining, at the one or more server devices during the video conference, a second rearrangement of the content items based on the second metadata determined for each of the content items, wherein locations of the content items relative to one another in the second rearrangement are different from the initial locations and from the locations of the content items in the first rearrangement;
    responsive to determining the first and second rearrangements, automatically outputting, from the one or more server devices for display at each of the one or more user devices, the first rearrangement to a first layer of the digital whiteboard software and the second rearrangement to a second layer of the digital whiteboard software to enable the one or more user devices to navigably access, within the digital whiteboard, either of the first rearrangement and the second rearrangement at a given time; and
    further training, at the one or more server devices, the trained machine learning model according to rearrangement information obtained from a user device of the one or more user devices after the automatic outputting of the first rearrangement to the first layer and the second rearrangement to the second layer, the rearrangement information indicating a new location for a content item different from a rearranged location of the first rearrangement or the second rearrangement.

2. The method of claim 1, wherein the first rearrangement and the second rearrangement are determined responsive to input received from one of the one or more user devices.

3. The method of claim 1, the method comprising:
    determining, using the trained machine learning model, that two or more of the content items correspond to common text content based on an ontological relationship determined between the two or more of the content items, and
    wherein determining the first rearrangement comprises:
        using only one of the two or more of the content items within the first rearrangement.

4. The method of claim 1, wherein the content items include a first content item comprising a text object and a second content item comprising a non-text object, and wherein a second learning model trained for object recognition is used to determine metadata for the second content item.

5. The method of claim 1, wherein determining the first rearrangement comprises:
    determining a sequence of operations associated with two or more of the content items having common first metadata; and
    rearranging the two or more of the content items to represent a flowchart indicative of the sequence of operations.

6. The method of claim 1, wherein one or more of the content items is added to the digital whiteboard software by processing an image representing a physical content item within a physical space.

7. The method of claim 1, wherein the first layer of the digital whiteboard software and the second layer of the digital whiteboard software are different from a source layer of the digital whiteboard software within which the content items are identified.

8. A non-transitory computer readable medium storing instructions operable to cause one or more processors to perform operations comprising:

training, using a training data set corresponding to past digital whiteboard content item rearrangements, a machine learning model for text detection and recognition using natural language processing to enable the trained machine learning model to determine metadata associated with digital whiteboard content items;

instantiating, during a video conference implemented using conferencing software of a unified communications as a service software platform and to which one or more user devices are connected, a digital whiteboard using digital whiteboard software of the unified communications as a service software platform;

generating, according to input obtained from the one or more user devices during the video conference, content items within the digital whiteboard at initial locations relative to one another;

for each of the content items, processing, during the video conference, the content item using the trained machine learning model to determine first metadata corresponding to text or non-text content visually represented within the content item and second metadata corresponding to data not visually represented within the content item;

determining, during the video conference, a first rearrangement of the content items based on the first metadata determined for each of the content items, wherein locations of the content items relative to one another in the first rearrangement are different from the initial locations;

determining, during the video conference, a second rearrangement of the content items based on the second metadata determined for each of the content items, wherein locations of the content items relative to one another in the second rearrangement are different from the initial locations and from the locations of the content items in the first rearrangement;

responsive to determining the first and second rearrangements, automatically outputting, for display at each of the one or more user devices, the first rearrangement to a first layer of the digital whiteboard software and the second rearrangement to a second layer of the digital whiteboard software to enable the one or more user devices to navigably access, within the digital whiteboard, either of the first rearrangement and the second rearrangement at a given time; and further training the trained machine learning model according to rearrangement information obtained from a user device of the one or more user devices after the automatic outputting of the first rearrangement to the first layer and the second rearrangement to the second layer, the rearrangement information indicating a new location for a content item different from a rearranged location of the first rearrangement or the second rearrangement.

9. The non-transitory computer readable medium of claim 8, wherein the trained machine learning model determines the first metadata for each content item based on a semantic neighborhood of the content item relative to other ones of the content items.

10. The non-transitory computer readable medium of claim 8, wherein at least one of the content items is automatically added to the digital whiteboard software based on a real-time transcription of the video conference.

11. The non-transitory computer readable medium of claim 8, wherein the content items are automatically processed on a periodic basis to determine the first rearrangement and the second rearrangement.

12. The non-transitory computer readable medium of claim 8, wherein the content items are color coded to identify source locations of the content items within a source layer of the digital whiteboard software.

13. An apparatus, comprising:

a memory; and a processor configured to execute instructions stored in the memory to:

train, using a training data set corresponding to past digital whiteboard content item rearrangements, a machine learning model for text detection and recognition using natural language processing to enable the trained machine learning model to determine metadata associated with digital whiteboard content items:

instantiate, during a video conference implemented using conferencing software of a unified communications as a service software platform and to which one or more user devices are connected, a digital whiteboard using digital whiteboard software of the unified communications as a service software platform;

generate, according to input obtained from the one or more user devices during the video conference, content items within the digital whiteboard at initial locations relative to one another;

for each of the content items, process, during the video conference, the content item using the trained machine learning model to determine first metadata corresponding to text or non-text content visually represented within the content item and second metadata corresponding to data not visually represented within the content item;

determine, during the video conference, a first rearrangement of the content items based on the first metadata determined for each of the content items, wherein locations of the content items relative to one another in the first rearrangement are different from the initial locations;

determine, during the video conference, a second rearrangement of the content items based on the second metadata determined for each of the content items, wherein locations of the content items relative to one another in the second rearrangement are different from the initial locations and from the locations of the content items in the first rearrangement;

responsive to the determinations of the first and second rearrangements, automatically output, for display at each of the one or more user devices, the first rearrangement to a first layer of the digital whiteboard software and the second rearrangement to a second layer of the digital whiteboard software to enable the one or more user devices to navigably access, within the digital whiteboard, either of the first rearrangement and the second rearrangement at a given time; and further train the trained machine learning model according to rearrangement information obtained from a user device of the one or more user devices after the automatic outputting of the first rearrangement to the first layer and the second rearrangement to the second layer, the rearrangement information indicating a new location for a content item different from a rearranged location of the first rearrangement or the second rearrangement.

14. The apparatus of claim 13, wherein the instructions include instructions to:
produce a document indicating the content items rearranged according to one or both of the first rearrangement or the second rearrangement.

15. The apparatus of claim 13, wherein a first subset of the content items include text objects and a second subset of the content items include non-text objects.

16. The apparatus of claim 13, wherein the content items are identified within a source layer of the digital whiteboard.

17. The method of claim 1, wherein the digital whiteboard is accessible by at least some of the one or more user devices after the video conference ends.

18. The non-transitory computer readable medium of claim 8, wherein the digital whiteboard is accessible by at least some of the one or more user devices after the video conference ends.

19. The apparatus of claim 13, wherein the digital whiteboard is accessible by at least some of the one or more user devices after the video conference ends.

* * * * *